United States Patent [19]

Van Maren et al.

[11] Patent Number: 5,579,516

[45] Date of Patent: Nov. 26, 1996

[54] METHOD FOR STORING DATA FILES ON A MULTIPLE VOLUME MEDIA SET

[75] Inventors: David J. Van Maren; Jeffrey Dicorpo, both of Fort Collins, Colo.

[73] Assignee: Hewlett-Packard Company, Palo Alto, Calif.

[21] Appl. No.: 357,575

[22] Filed: Dec. 15, 1994

[51] Int. Cl.[6] .................................................. G06F 7/22
[52] U.S. Cl. .................... 395/601; 395/428; 395/833; 395/800; 364/246.11; 364/DIG. 1; 364/960; 364/DIG. 2
[58] Field of Search .................................. 395/600, 700, 395/575, 275, 425; 364/200

[56] References Cited

U.S. PATENT DOCUMENTS

| | | | |
|---|---|---|---|
| 508,630 | 4/1895 | Moss | 395/425 |
| 4,575,827 | 3/1986 | Kulakowski | 365/230 |
| 4,945,475 | 7/1990 | Bruffey et al. | 364/200 |
| 5,029,125 | 7/1991 | Sciupac | 364/900 |
| 5,040,110 | 8/1991 | Miki et al. | 364/200 |
| 5,093,779 | 3/1992 | Sakurai | 395/600 |
| 5,129,088 | 7/1992 | Auslander et al. | 395/700 |
| 5,247,660 | 9/1993 | Ashcraft et al. | 395/600 |
| 5,321,824 | 6/1994 | Burke et al. | 395/425 |
| 5,337,197 | 8/1994 | Brown et al. | 360/48 |
| 5,347,651 | 9/1994 | Burke et al. | 395/600 |
| 5,360,651 | 11/1994 | Baxter et al. | 428/64 |
| 5,371,885 | 12/1994 | Letwin | 395/600 |
| 5,386,516 | 1/1995 | Monahan et al. | 395/275 |
| 5,392,427 | 2/1995 | Barret et al. | 395/600 |
| 5,437,012 | 7/1995 | Mahajan | 395/164 |
| 5,446,857 | 8/1995 | Russ | 395/427 |
| 5,485,606 | 1/1996 | Midgdey et al. | 395/600 |

*Primary Examiner*—Thomas G. Black
*Assistant Examiner*—C. Pham

[57] ABSTRACT

A method for storing a set of files on a multiple volume media set supports the ISO/IEC 13346 standard for optical media while minimizing swapping and temporary storage requirements when the multiple volume media set is used in an optical disk autochanger. The method allows the media set (e.g., optical disks) to be self-describing in accordance with the ISO/IEC 13346 standard. However, when the media set is on-line, the meta-data is separated from the data to optimize on-line performance. The method sequentializes the meta-data of the file set before writing it to the media set to achieve these advantages.

17 Claims, 9 Drawing Sheets

METHOD FOR STORING DATA FILES ON A MULTIPLE VOLUME MEDIA SET

BACKGROUND OF THE INVENTION

1. Field of the Invention

The invention relates to a method for storing data on multiple volumes of a media set and, more particularly, to storing data on multiple optical disk volumes in an optical disk autochanger.

2. Related Art

A format describes the manner in which a file is organized on a piece of storage media such as an optical disk. The simplest formats are sequential. In a sequential format, the files must be written to and read from the media in a sequence from beginning to end. Non-sequential formats do not require a specific reading or writing order and allow file and directory information to be modified without having to rewrite the entire data set. Allowing the file and directory information to be modified, however, significantly increases the complexity of the format. Since file structures do not merely physically follow one another as in the sequential format, the non-sequential format requires that the file structures be explicitly linked together. The links are used to locate specific files or specific portions of files. When updating information about a file, these links must be maintained. Maintaining these links requires that some file structures be rewritten.

The ISO/IEC 13346 standard provides a standard file format for optical disk storage. This format is non-sequential in nature, making it suitable for use in on-line storage systems. The ISO/IEC standard format is suitable for use in file sets stored on a single media surface such as a stand alone optical drive. However, when such file formats are used for a file set stored on multiple surfaces, the links between the file structures will inevitably cross surface boundaries. As a result of the links crossing surface boundaries, even very simple operations, such as reading a directory can become a complex operation. This is because whenever the links cross surfaces, updating and following these links require an optical disk swap.

Swap times are approximately three orders of magnitude longer than seeks times. It is possible that the disk swapping required to perform such a simple task as listing the files in a directory may take tens of minutes. Not only is this unacceptable from a performance standpoint, unnecessary swapping results in added stress on the optical disk autochanger. In fact, listing the files in a directory may cause an autochanger to appear as if it is being given a stress test. Thus, swap minimization is a key challenge for file systems on autochangers.

One approach to swap minimization is to disallow any links from crossing surface boundaries. This may be implemented by assigning separate file sets to each surface. This may work well in some situations, but requires extra software or administrative effort to prevent over-full or empty surfaces. In many cases, the administrative effort is awkward and resource-consuming.

Another approach to swap minimization is to allow links to span surfaces, but to keep the linked structures on a single surface or group of surfaces which are always on-line. That is, the file data stored on the optical disk surfaces is separated from the information about the files. The information about the files includes, for example, directory hierarchy information, file names, file attributes, volume free space and volume attributes. This information is known as meta-data.

In this method, the meta-data may be stored, for example, on a non-removable magnetic hard disk which is dedicated to storing the linked structures. Thus, in this method, data is maintained on the optical disk surfaces while the meta-data is separated and placed on a dedicated storage means. When the optical disks are to be removed from the autochanger, however, the meta-data must be written to the optical disks so that a user is presented with a stand-alone media set.

The ISO/IEC standard assures file compatibility from one application to another. However, when the meta-data is written to the optical disks, it is not written in any way which allows it to be quickly read. Thus, when the optical disks are again loaded into an autochanger, many swaps may be required to move the meta-data back to a dedicated magnetic disk.

What is needed is a method for storing the meta-data on a multiple volume media set in a format that is compatible with the ISO/IEC standard so that compatibility is maintained, and which also allows the meta-data to be efficiently read from and written to the optical surfaces with a minimum number of swaps.

SUMMARY OF THE INVENTION

The invention is a method for storing a file set on a multiple volume media set such that swapping is minimized. The method allows the media set (e.g., optical disks) to be self-describing in accordance with the ISO/IEC 13346 standard. However, when the media set is on-line, the meta-data is separated from the data to optimize on-line performance.

A file set generally includes data and meta-data. The meta-data includes directory information (directories) and file information (information control blocks or ICBs). In accordance with the invention, the individual ICBs are sequentialized and stored to the optical disks. Similarly, the directories are also sequentialized and stored to the optical disks. If the data itself is not already resident on the optical disks, then the data may also be sequentialized.

In accordance with the invention, the meta-data and data are written to the media volumes in recursive descent order to minimize the amount of temporary storage required to build and write the meta-data. If the data is not already on the optical disks, then the data is written to optical disk first, followed by the directories (meta-data) and finally the information control blocks or ICBs (meta-data). However, before the data files are written to optical disk, a block of addresses are allocated on the optical disks for an ICB table. Once this space has been allocated, the data files may be written to the optical disks. Thereafter, the allocated ICB addresses may be assigned to directories and directory entries as the directories are built. Once all directories have been built, the directories are written to the optical disks. The directories may be written to the optical disks near the space allocated for the ICBs. However, this is not required. Finally, the ICBs are written into the previously allocated space. This results in a data set which has sequential data, sequential ICBs and sequential directories. Note, however, that the ICBs, directories and data are not necessarily sequential as a whole.

Oftentimes, the data files already reside on the optical disks. Therefore, the step of writing the actual data files to the media surfaces may not be necessary. If this case, the data files will be in a non-sequential format. Nonetheless, the ICBs and directories may be written to the optical disks in sequential format as space on the disk is available. The resulting data format will be partially sequential, i.e., sequential meta-data and non-sequential data.

When a media volume set structured according to the invention is put on-line in an autochanger, the meta-data is taken off of the media volumes and stored on a dedicated volume, e.g., a magnetic disk or solid state memory device. The invention allows the meta-data to be quickly retrieved from the dedicated volume because it is stored sequentially. Before the media set is taken off-line, the meta-data is written from the dedicated volume back to the multiple volume media set in a sequential format (as described above) that will allow it to be later read back from the media set with a minimum number of swaps.

The invention writes meta-data in a sequential format. This format, while sequential, however, does not interfere with non-sequential access to the meta-data. Thus, the invention is particularly suited for use with multiple volume media sets which conform to the ISO/IEC 13346 standard.

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

The preferred embodiment of the invention is discussed in detail below. While specific part numbers and/or configurations are discussed, it should be understood that this is done for illustration purposes only. A person skilled in the relevant art will recognize that other components and configurations may be used without parting from the spirit and scope of the invention.

The preferred embodiment of the invention is now described with reference to the figures where like reference numbers indicate like elements. Also in the figures, the left most digits of each reference number corresponds to the figure in which the reference number is first used.

In the ISO/IEC standard data storage format used with optical media, a data file is written to one or more extents spread across one or more optical disk surfaces. Each extent, when an optical disk drive conforms to the SCSI (small computer system interface) standard, may be referenced by a sector address and a number of following sectors. The meta-data for the data file is stored in a file entry inside an information control block or ICB. This file entry is similar to a UNIX inode. It includes a variety of information about the data file. For example, the file entry includes the file size, file address, extents, creation date, access restrictions, etc. The file entry, however, does not include the file name or the directory which references or lists the file.

An information control block (ICB) is a structure which allows file entry information to be changed on WORM (write once, read many) media. Thus, the ICB is a mechanism for writing file entries. For purposes of the present invention and for ease of discussion, however, the term "ICB or information control block" is used to mean an ICB along with its file entry.

Directory structures or files provide an index to the data files on a disk or set of disks. Each disk or disk set includes at least a root directory and may further include a plurality of subdirectories. Each directory is stored in a file. For each data file or subdirectory listed in a directory, the directory will list the file or the subdirectory name and the address of the ICB for that file (or subdirectory). The directory, unless it is the root directory, also lists the address of its parent directory's ICB. The root directory lists the address of its own ICB since it has no parent.

Figure 1:
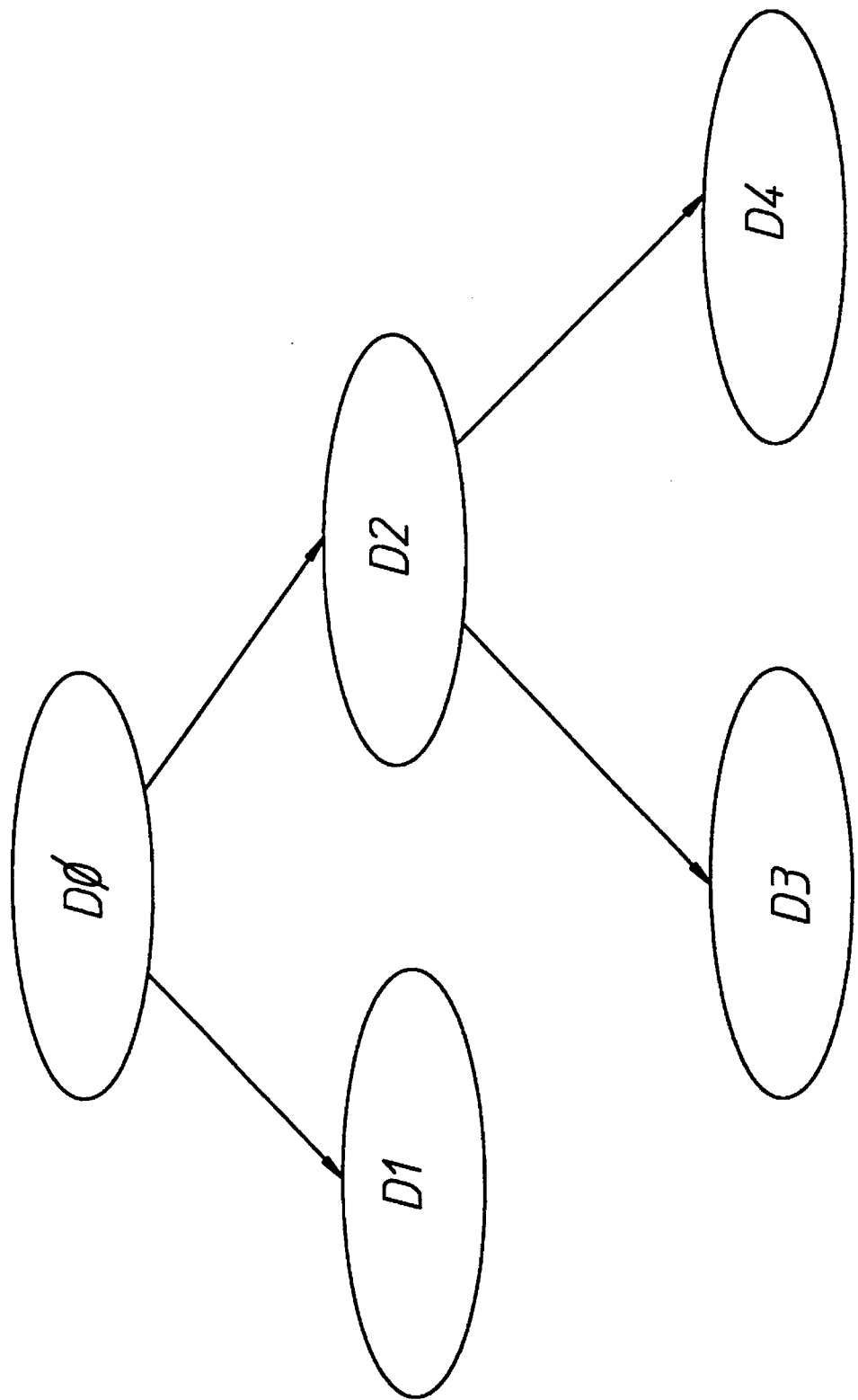
FIG. 1 is a diagram illustrating an example directory hierarchy.

FIG. 1 provides an example illustrating a root directory D0 having subdirectories D1 and D2. Directory D2 has subdirectories D3 and D4. For each of these directories, the directory itself, an ICB structure that points to the directory, and an ICB structure that points to each file (including subdirectories) in the directory must be stored in the media set. Thus, for these five directories, fourteen structures must be written to the disk. These include:

| Structure | Explanation |
| --- | --- |
| D0' | ICB for directory D0 |
| F01' | ICB for first file in directory D0 |
| F02' | ICB for second file in directory D0 |
| D1' | ICB for directory D1 |
| D2' | ICB for directory D2 |
| F21' | ICB for first file in directory D2 |
| F22' | ICB for second file in directory D2 |
| D3' | ICB for directory D3 |
| D4' | ICB for directory D4 |
| D0 | Directory file D0 |
| D1 | Directory file D1 |
| D2 | Directory file D2 |
| D3 | Directory file D3 |
| D4 | Directory file D4 |

One approach to writing this information to optical disk would be to first write the ICB for directory D0, followed by directory D0. However, writing directory D0 requires knowing where the ICBs for directories D1 and D2 are going to be written. Writing the ICBs for directories D1 and D2 requires knowledge of the location and size of the directory files for directories D1 and D2. This interrelationship is illustrated in FIG. 2.

Figure 2:
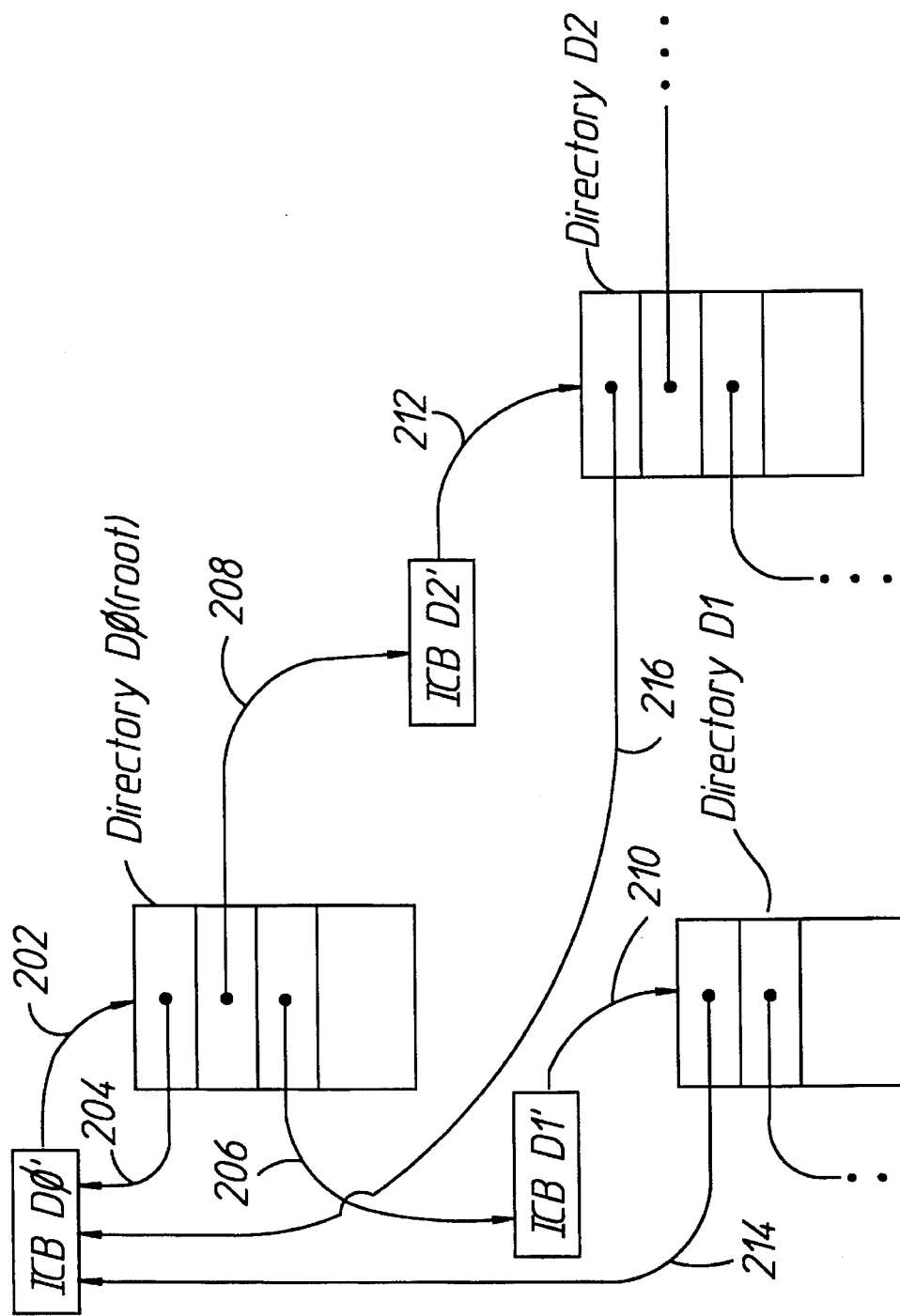
FIG. 2 is a diagram illustrating the relationship between several directories of FIG. 1 and their corresponding information control blocks.

FIG. 2 illustrates the complex relationship between directories D0, D1 and D2 and their ICBs. For ease of discussion, directories D3 and D4 have been omitted. As indicated by line 202, ICB D0 points to the location of directory D0. Directory D0 includes an entry pointing back to its parent directory, as indicated by line 204. In the case of directory D0, line 204 points to its own ICB, since directory DO is the root directory. Directory DO includes entries for directories D1 and D2. The directory entries for directories D1 and D2 include the addresses of the ICBs for directories D1 and D2, as indicated by lines 206 and 208, respectively. ICBs D1' and D2' then include the extents for the directory files D1 and D2, respectively, as indicated by lines 210 and 212. Note that directory files D1 and D2 include pointers to the ICB (D0') of their parent directory (DO) as indicated by lines 214 and 216.

As illustrated by this diagram, the links between the files, directories and ICBs can become quite convoluted when many files are involved in the file set. It is this convoluted series of links that can necessitate that multiple disk swaps occur in performing a simple task such as listing a directory. For example, the ICBs and directories illustrated in FIG. 2 may be spread across multiple surfaces of a disk set. Each time a pointer between an ICB and a file crosses a surface boundary, a swap is required.

The present invention is directed towards minimizing a number of swaps required to read this meta-data from or write this meta-data to one or more volumes of a multiple volume disk set. The amount of temporary storage required to build the meta-data is also minimized by the method of the invention by making multiple passes through the file information. Minimizing the amount of required temporary storage can be critical considering the numbers of files and directories which may reside on a group or set of optical disks inside an autochanger. The invention achieves these advantages by sequentializing the meta-data to be stored to the optical disks.

In a preferred embodiment, data and meta-data are written to the optical disks in a sequential fashion as discussed below. In an alternate embodiment, the data files are already on the optical disk surfaces and only the meta-data is sequentialized and written to the disks. In accordance with the standard, the header information on one of the disk volumes of the volume set (i.e., normally the last volume in the set) is modified to indicate that the data has been written in a sequential manner.

Fully Sequential Write

Figure 3:
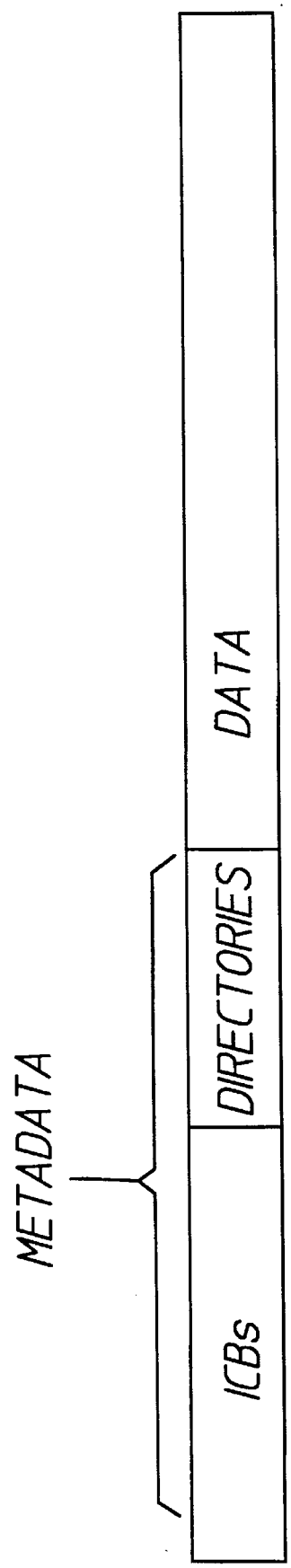
FIG. 3 is a diagram illustrating the fully sequential storage of meta-data and data on a disk volume set.

In the embodiment of fully sequentializing the data and meta-data written to the optical disk surfaces, the data and meta-data are written to the disk surfaces such that the ICBs appear first, the directories appear next, and the data appears last. This is illustrated in FIG. 3. The ICBs, directories and data, however, are written in reverse order from how they appear in the sequential data stream. Note, that in FIG. 3, the ICBs, directories and data are illustrated as being sequential with one following the other. This however is not required by the invention. What is meant by "fully sequential" is that the ICBs are all written sequentially in one or more extents, the directories are written sequentially in one group of extents, and the data files are written sequentially in one group of extents. By "partially sequential," what is meant is that the ICBs and directories are written sequentially to the extent possible given that they will likely be written to space on disk as available and will likely be interleaved with extents of data files. The data files will not be written sequentially.

Figure 4:
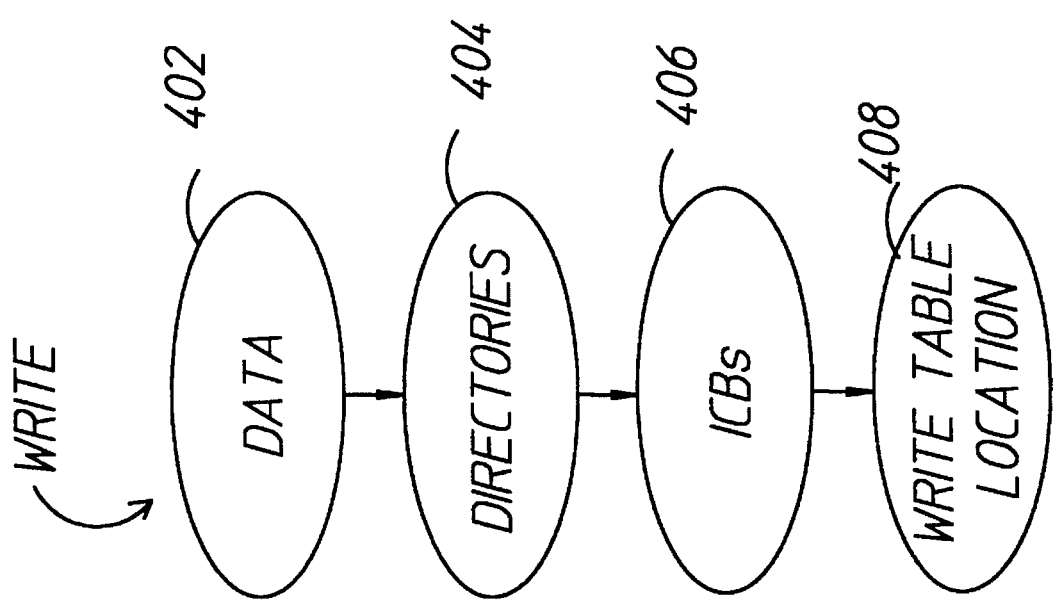
FIG. 4 is a simplified flow chart illustrating the steps of sequentially writing data and meta-data to a disk volume set.

The high level method for writing the meta-data and data to optical disk is illustrated in FIG. 4. As illustrated, the data is written first in a step 402. The directories are written next in a step 404, and finally, the ICBs are written in a step 406. Once the ICBs have been written, a list or map of the extents of the ICB table (i.e., where the ICB table is located) is written in step 408 to the volume header or, alternatively, in an implementation specific attribute of the ICB for the root directory.

In step 402, the file data is written to the disk surfaces in the proper recursive descent order. That is, starting at the root directory, the data found in each file is written to disk. This allows files which are broken up into multiple extents to span across surface boundaries. It is not required that the file names be stored at this time. Rather, a list of extents is stored in temporary storage (e.g., a solid state cache or other memory device). As described below, a pass will be made through this data when building the ICBs.

In step 404, the directories are built and written to the disk in the same recursive descent order as described above. Since directories tie the file names and ICBs together, the ICB addresses must be assigned to each file before the directories can be built. It is not necessary to write the ICBs at this time. However, it is necessary to allocate the space on the disk surfaces in which the ICBs will be later stored. By "allocate," it is meant to reserve the addresses on the disk surfaces for the later storage of the ICBs.

This allocated space is called an ICB table. Space for the ICB table may be allocated on disk by determining a total number of files, including both directory files and data files, to be stored to the disk surfaces. Once this is known, a total number of required ICBs can be determined. For files containing a large number of extents, all of the extents may not fit in a single sector. For such files, overflow sectors or allocation extents must also be allocated in the ICB table. In addition, ICBs must be allocated for soft or logical links. A logical link is a file which contains a path to another file. Thus, space for the ICB table may be allocated on disk by determining an amount of space required to store ICBs for all data files and directory files as well as any overflow sectors and logical links in the set of files.

As the directories are built to include file names and ICB addresses from the ICB table, the directories are written to disk. As the directories are written to disk, the locations and lengths of the directories are stored in temporary storage. Use of the locations and lengths (extents) of the directories is described below.

Finally, in step 406, the ICBs are built and written to disk. Each ICB includes a list or map of the extents into which the corresponding file is written to the disk. The attributes in the ICB are obtained from an existing source. For example, the attributes may be retrieved from an existing file system where the data files originated. The extent information for the data files and directories comes from the temporary storage generated at steps 402 and 404, respectively. Note that an overflow sector, whenever needed, is placed immediately subsequent to the ICB referencing it. The overflow sector will have been accounted for in the original allocation of space required for the ICB table.

Partially Sequential Data

Oftentimes, the data files will already be stored on the disk surfaces. In this case, the meta-data may still be written according to steps 404 and 406. When this is done, it is assumed that extent information about each file will be available. Thus, the difference between writing fully sequential data and partially sequential data, is that step 402 will be skipped, and in step 406 the extent information about a data file will come from a different source than the temporary storage. The data, being previously present on the disk surfaces, may be scattered randomly across all the disks in the volume set, leaving multiple "holes" for the meta-data to be placed. Alternatively, some room may be available only on the last disk in the volume set. The method of the invention will operate in either case.

When a single extent (e.g., on the last disk of the volume set) is available, the meta-data is written sequentially inside the extent as illustrated in FIG. 3. In the case where the data is randomly scattered across the disks in the volume set and a single extent large enough for the meta-data is not available, than each available extent is used in a sequential fashion such that all available extents on a given surface are used before any extents are used on subsequent surfaces. The meta-data will look similar to that illustrated in FIG. 3. However, it will be interspersed with data. In this case, a map of all extents used for the ICB table must be maintained in, for example, the volume header or root directory ICB.

Write Example

Figure 5:
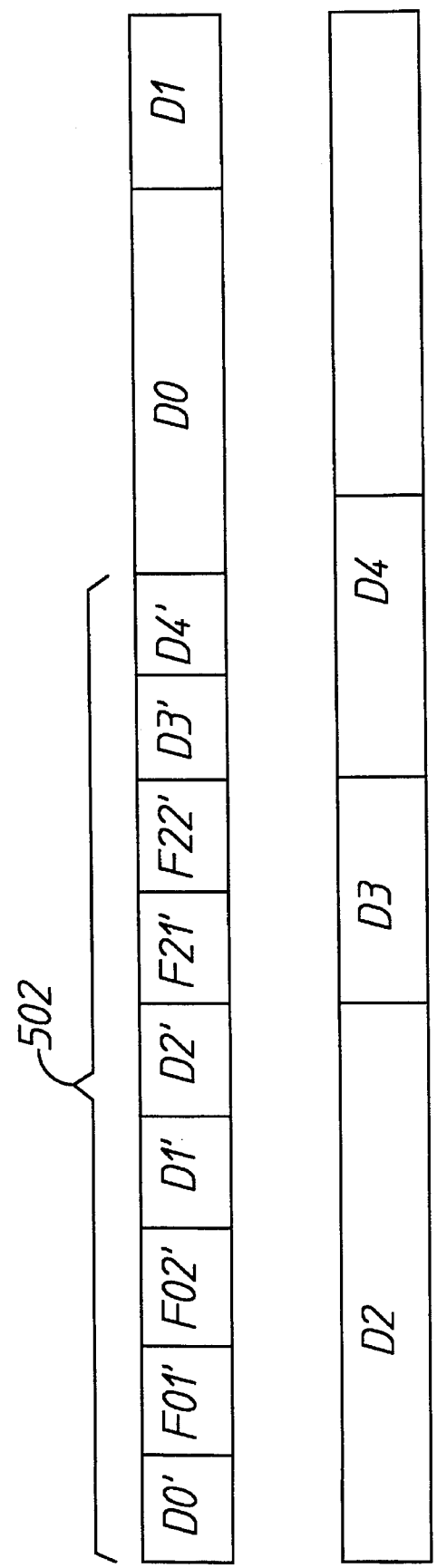
FIG. 5 is a diagram illustrating the layout of meta-data in a sequential fashion in accordance with the invention.

An example of sequential meta-data written according to the present invention is illustrated in FIG. 5. This example illustrates meta-data for the sample directory structure of FIG. 1. Note that no data files are present in this example. The invention begins by counting the total number of directory files and data files in the file set. Overflow extents and logical links are also counted. This will determine the size of the ICB table. The ICB table is indicated by reference number 502 in FIG. 5. In the meta-data structure of FIG. 5, the directories and meta-data structures are identified as set forth in the table above.

Once space has been allocated on the disks for the ICB table, the directories are built starting with directory D0. As entries are added to the directories, ICBs are allocated from the ICB table. Each time an ICB is allocated, the ICB location is taken from an address pointed to by a pointer in the ICB table. The pointer is then incremented to the next ICB location. The ICBs are not stored in the corresponding locations in the ICB table at this time. Rather the table addresses are only used to build the directories. Once a directory is built, it is written to the disk surface, starting at the location determined or identified as the end of the ICB table. As illustrated, directory D0 is written to optical disk at a portion directly following ICB table 502. The starting location and length of directory DO is then recorded in temporary storage.

Next, the method continues to build the remaining directories in a similar fashion and to write them to the disk set. As illustrated, directories D1, D2, D3 and D4 are written to the disk set in a recursive descent pattern following directory D0. After all the directories are written to the disk set, the ICB table is built and written to the disk set.

The ICB table is built as follows. First, the ICB table pointer is set to the beginning of the table (the ICB address for D0' in the example). The directories and their entries are visited in the same order as made in the first pass through the directories, when the directories were written. Each time, an ICB is written to the location pointed to by the ICB table pointer. The pointer is then incremented. If the ICB corresponds to a directory, then the corresponding location and length or extent information is retrieved from temporary storage. If the directories and directory entries are visited in the same order as they were when the directories were written, then the ICB addresses will match those referenced by the directories already written to disk.

Fully Sequential Read

Figure 6:
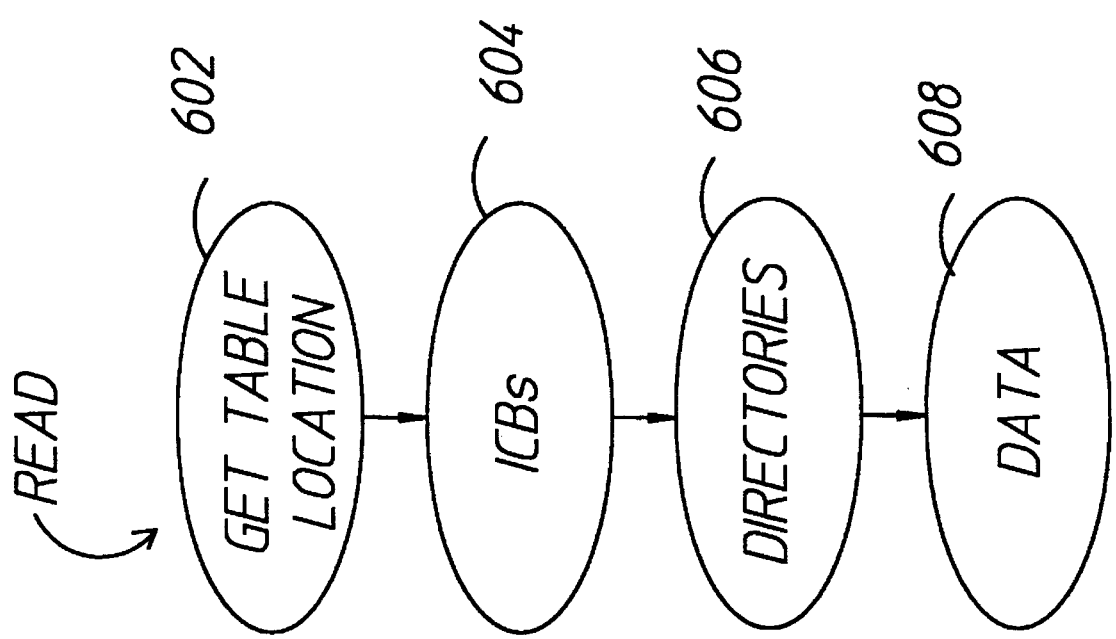
FIG. 6 is a simplified flow chart illustrating the reading of meta-data and data from a disk volume set in accordance with the invention.

In the fully-sequential case, the meta-data and data are read through the disk surfaces in the sequential fashion implied by its order on the media. First the ICBs are read, then the directories are read, and finally, the data files are read. This is illustrated in the flow chart of FIG. 6. In a step 602, the location of the ICB table is determined. Preferably, the ICB table extent is stored in the volume header or root directory ICB as discussed above.

In a step 604, all ICBs are read in sequential fashion. Note, that this causes the data to be read in the same recursive descent order with which it was stored. This step of the invention likely requires the most temporary storage because the attributes and extents found in the ICBs must be maintained in temporary storage. This will allow any ICB to be retrieved, given its address.

In one embodiment, the ICBs are maintained in temporary storage by creating a file for each ICB. The extent list is stored in the data space of the file. The file name is the ASCII form of the ICB address. This allows all pertinent file information to obtained for an ICB by simply opening the proper file using the ICB address as a file name.

In step 606, all directories are also read into temporary storage. File names are then associated with the ICB information from step 604. To read in the directories, the location and length of the first directory is obtained from the appropriate ICB. This is always the root directory. Once the root directory is read in and the names are attached to all the files and directories it contains, each subdirectory is visited in a recursive fashion and the same operation is performed. Note that as this basic recursive descent is performed, the physical order of reading directories is sequential. In the embodiment where the ICB information is held in files named by their ICB addresses, the files are simply renamed or changed into directories as appropriate. Once this step is complete, the directories will be in their final state and the files will contain their extent lists.

In step 608, the data is read from the optical disks, if desired. Again, this is done in a recursive descent fashion, where all files and all directories are visited and the data is copied from the disk set to a desired storage medium, such as a dedicated magnetic disk.

Partially Sequential Read

In the case where the data has not been written sequentially because, for example, it already existed on the disk set, step 606 may be interleaved with step 608 in order to sequentialize the read process as much as possible. This involves visiting all the stored ICBs and looking for extents on the current surface. These extents may all be gathered and restored in some optimized sequential and/or bulk fashion such that all data is read from the disk surface before swapping in a new disk surface. Alternatively, the data files may be retrieved as the ICBs are found. In this scenario, extra buffering is required to make the data retrieval as efficient as possible.

Note that since the location of all the data cannot be known until all the ICBs have been read in, if an ICB segment spans a surface boundary, it is possible that multiple visits to a disk may be required. Nonetheless, the invention still minimizes the number of visits required to a surface as compared to known data storage techniques.

Reading Fully Non-Sequential Data

In the case where data and meta-data have not been written sequentially, the method of the invention uses the same recursive descent method as described above. As directories are read as indicated at step 606, each ICB referenced by a directory must be read from the disk surfaces, rather than temporary storage. This involves extra seeks on the disk and may involve swapping. However, this is the price that must be paid for the data which was originally written in a non-sequential fashion. The data may also be retrieved in this same step. However, additional temporary storage will be required.

Compatibility

The method of the invention is directed toward minimizing file swapping and temporary storage requirements in an optical disk autochanger for multiple volume media sets. The invention accomplishes this by storing data on the media set in a format which is fully compatible with ISO/IEC 13346 file format standard. Preferably the data will be stored according to the invention in a fully sequential format.

Figure 9:
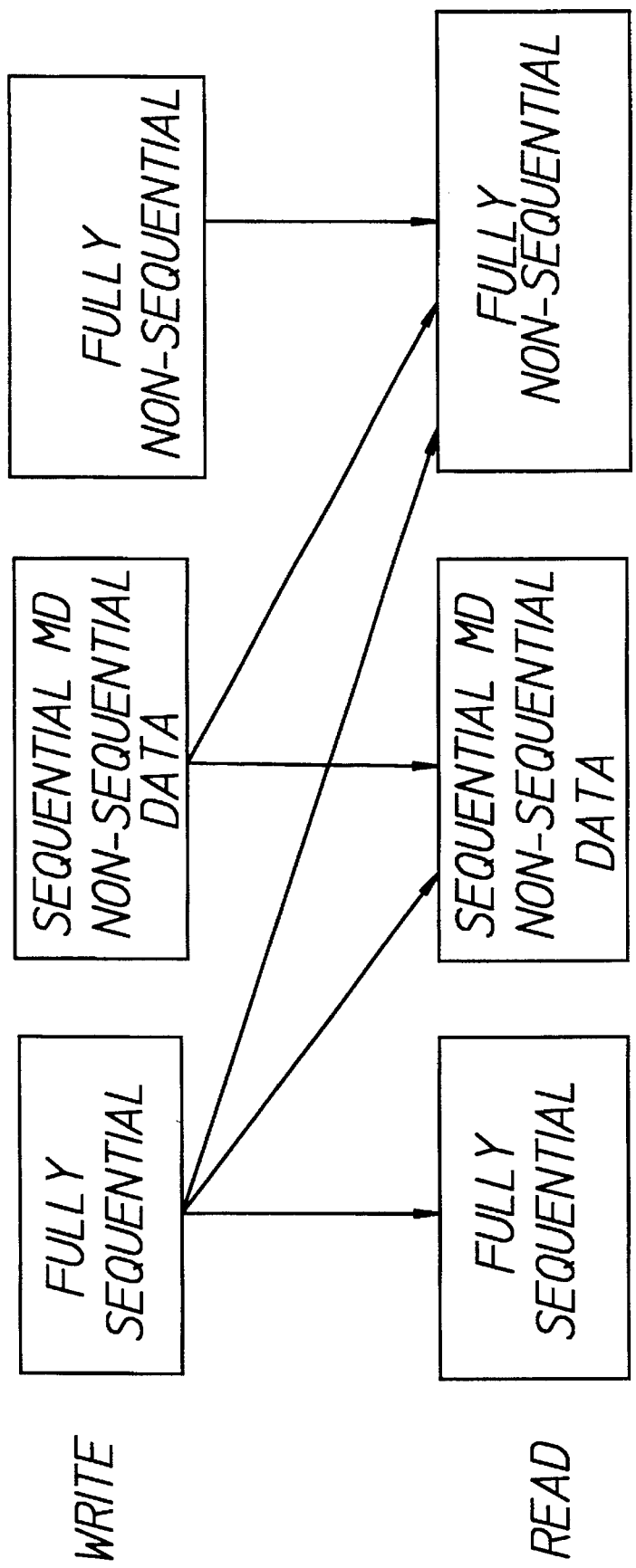
FIG. 9 is a block diagram illustrating compatibility of the different embodiments of the invention.

This method is a hybrid format in that it is sequentially written and optimized for sequential reading and writing. However, all of the links between structures are intact such that applications uninformed of the sequential formatting may read the files sets from the disk volumes. Thus, the media set may be read fully sequentially or fully non-sequentially. In addition, the meta-data may be read sequentially and the data read non-sequentially. In the embodiment where the data is stored non-sequentially and the meta-data is stored sequentially, fully sequential reading will not be supported. If the data is written fully non-sequentially, it may be read only non-sequentially. This is illustrated in the diagram of FIG. 9.

Figure 7:
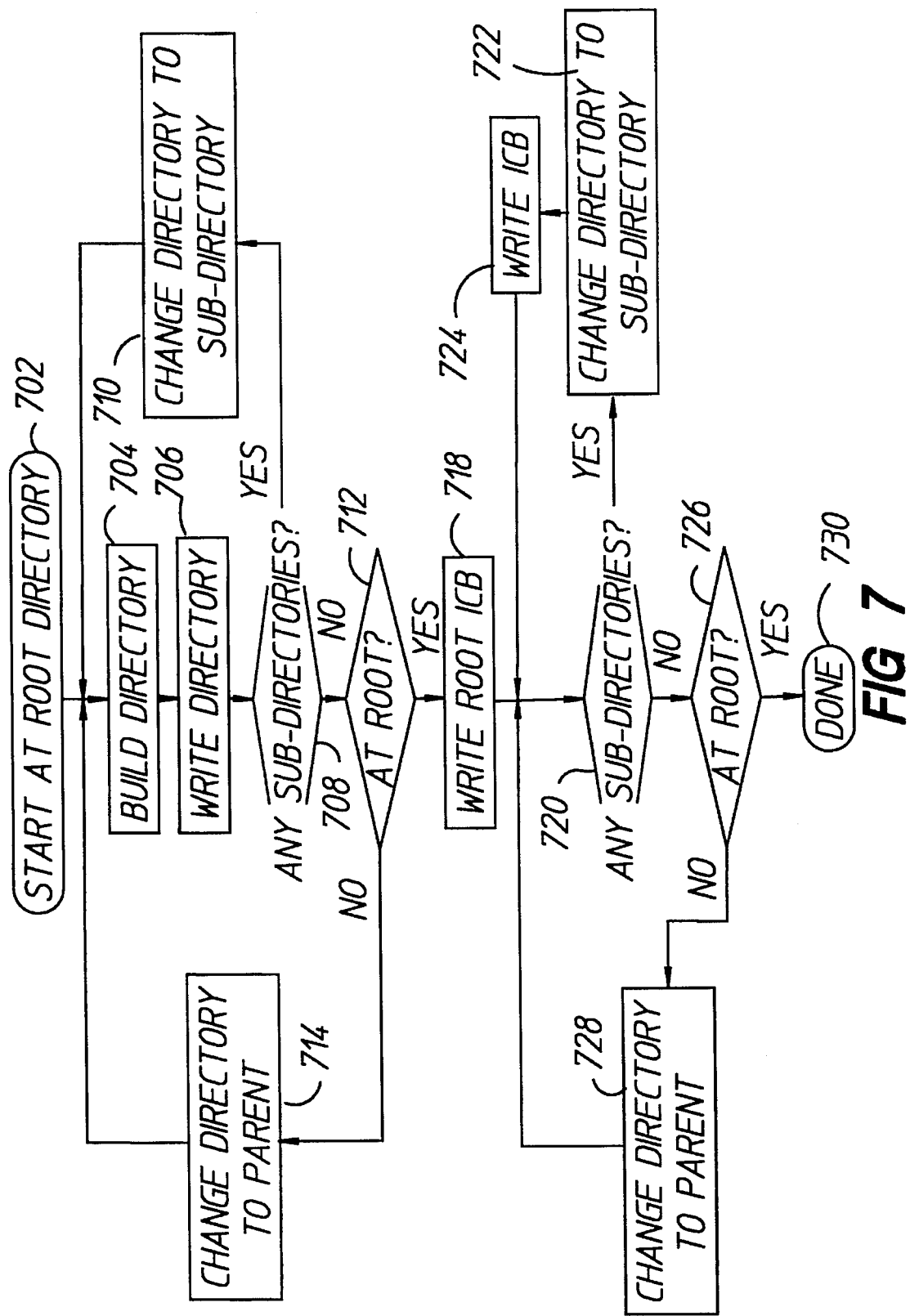
FIG. 7 is a flow chart illustrating the steps of building and writing meta-data to a disk volume set in a sequential fashion in accordance with the invention.

FIG. 7 is a detailed flow chart showing the preferred steps of the method for building directories and ICBs and writing them to the disk volumes. Steps 702–712 are directed towards building and writing the directories. Steps 718–728 are directed to building and writing the ICBs.

As illustrated at step 702, the method starts at the root directory in accordance with the recursive descent scheme. In a step 704, the root directory is built. In a step 706, the root directory is written to the disk set. In a step 708, the directory entries in the root directory are checked for any subdirectories. If subdirectories exist, then the current directory is changed to a subdirectory at step 710. The method then repeats 704–708 for this subdirectory. The test of step 708 will cause directories to be built and written for all downstream subdirectories. If an additional subdirectory does not exist for the current directory, then step 712 checks to see if the current directory is the root. If it is not, the method changes directory to the parent of the current directory in a step 714 and steps 704–708 are repeated.

This method will assure that all directories and subdirectories are built and written to the disk set. Once no more subdirectories are found and the current directory is the root directory, then the method proceeds from step 712 to step 718. Step 718 writes the ICB for the root directory. At step 720, the method searches for subdirectories of the root directory. If a subdirectory is found, then it is selected as the current directory at step 722 and it's ICB is written in step 724. Note that the order that subdirectories are selected in step 722 must be the same as the order the subdirectories are selected in step 710 to assure correspondence of the ICB addresses and their directory files.

After step 724, the method then returns to step 720 until ICBs are written for all downstream subdirectories. At step 726, it is determined whether the current directory is the root directory. If the current directory is the root directory then the method completes at step 730. If the current directory is not the root directory, then the current directory is changed to the parent directory at step 728, and the method returns to step 720. This method will assure that an ICB is written for each directory and subdirectory.

Figure 8:
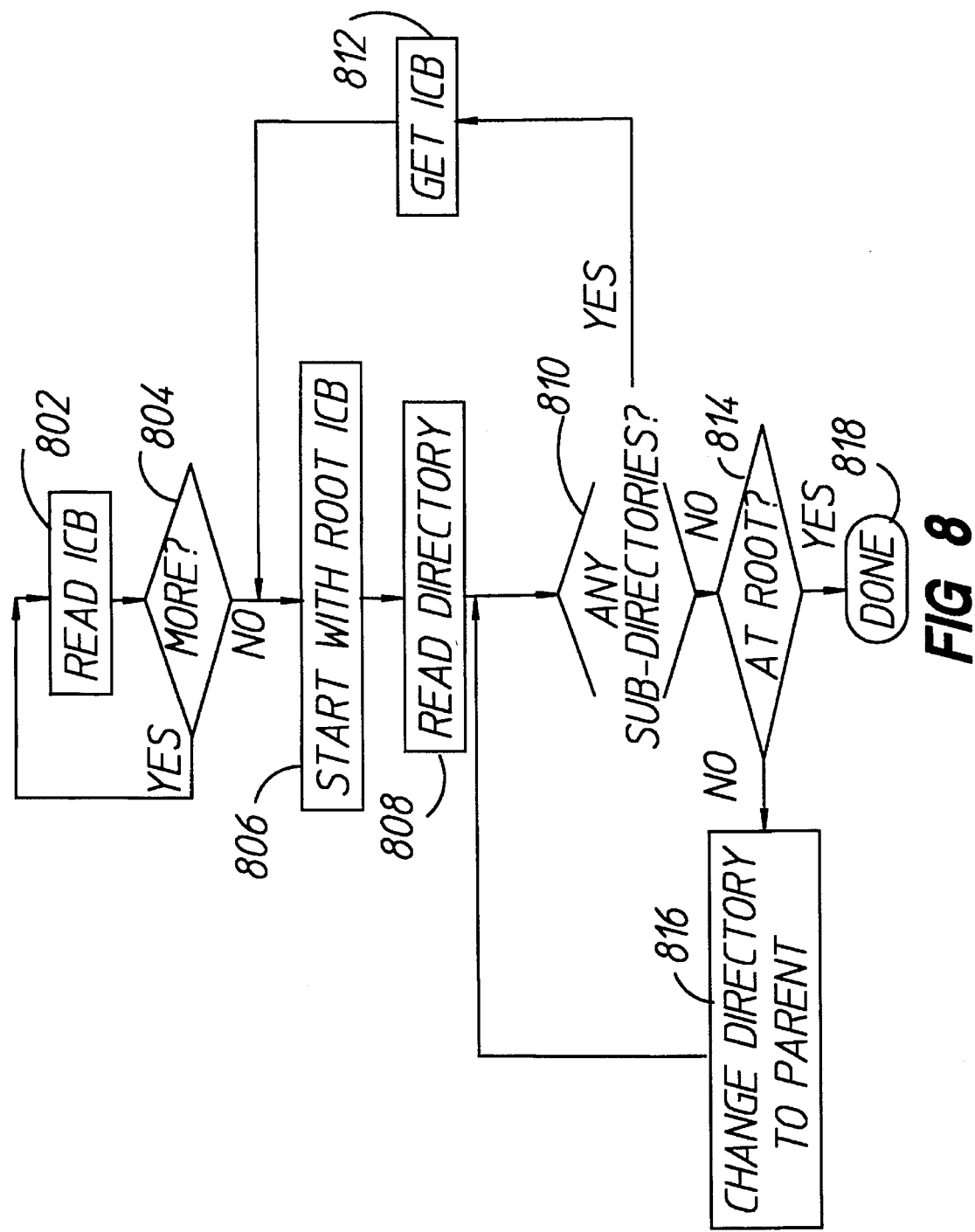
FIG. 8 is a flow chart illustrating the steps of reading sequential meta-data from a disk volume set in accordance with the present invention.

FIG. 8 illustrates the preferred method according to the invention for reading meta-data from the disk set. In steps 802 and 804, all ICBs are read from the disk sets. Once all ICBs have been read, the directories will be read starting with the root ICB as indicated at step 806. The root ICB will point to the root directory. The root directory is then read at step 808. The method checks for any subdirectories at step 810. If subdirectories are found, then the ICBs for the subdirectories are retrieved (from temporary storage) at step 812. The directory is then read into temporary storage at step 808. Steps 808 and 810 are then repeated until all downstream subdirectories have been read from the disk set. At step 814, it is determined whether the current directory is the root directory. If the current directory is the root directory, then the method ends at step 818. If it is not, then the current directory is changed to the parent directory at step 816, and the method returns to step 810. This method will assure that all ICBs and all directories are read from the disk set.

While the invention has been particularly shown and described with reference to several preferred embodiments thereof, it will be understood by those skilled in the art that various changes in form and details may be made therein without departing from the spirit and scope of the invention as defined in the appended claims.

What is claimed is:

1. A method for sequentially writing non-sequentially formatted meta-data for a set of files on a multiple volume media set, wherein said method minimizes a number of media swaps necessary to read and write said metadata from and to said multiple volume media set, comprising the steps of:

(a) determining an amount of space on said media set required to store an information control block table containing information control blocks for all data files and directories as well as any overflow sectors and logical links in the set of files;

(b) reserving space, on the multiple volume media set, for said information control block table to be recorded in a first portion having a size sufficient to store said information control block table;

(c) building a directory having an entry for each of its subdirectories and files, wherein each entry has an information control block address sequentially assigned to each of said subdirectories and said files;

(d) writing said directory to a second portion of the multiple volume media set;

(e) repeating steps (c)–(d) for every other directory file in said set of files, wherein said repeating step starts at a starting point and follows a preset order;

(f) building an information control block for each of said data files and directories in the set of files, directories and subdirectories; and (g) writing each of said information control blocks built at step (f) into said information control block table at said information control block address assigned in step (c), wherein the number of media swaps necessary to read and write said metadata from and to said multiple volume media set is minimized.

2. The method of claim 1, wherein said information control blocks are written in step (g) starting from said starting point and following said preset order, wherein any temporary storage required in steps (d)–(g) is reduced.

3. The method of claim 1, wherein step (a) comprises the steps of:

determining a total number of said data files and said directories in the set of files, directories and subdirectories; and determining a total number of said information control blocks, said overflow sectors and said logical links needed in said information control block table.

4. The method of claim 1, wherein said preset order is recursive descent order and wherein said starting point is root.

5. The method of claim 1, further comprising the step of:

(h) writing a list of extents describing a location of said first portion of media which holds said information control block table to a volume header in the multiple volume media set.

6. The method of claim 1, further comprising the step of:

(h) writing a list of extents describing a location of said first portion of media which holds said information control block table in an implementation specific attribute of said information control block for a root directory.

7. The method of claim 1, wherein said overflow sector is placed immediately subsequent to said information control block referencing it.

8. The method of claim 1, wherein said logical links are placed immediately subsequent to said information control block referencing it.

9. A method of reading metadata that has been stored sequentially for a set of files on a multiple volume media set according to the method of claim 2, so that a number of media swaps is minimized, comprising:

(a) finding a root directory or volume header for the set of files;

(b) obtaining, based on said root directory or said volume header, a location of a list of extents describing an information control block table;

(c) sequentially reading said information control block table and extracting from said information control block table a plurality of information control blocks, a plurality of overflow sectors and a plurality of logical links corresponding to each of said information control block addresses for each directory and subdirectory in the set of files;

(d) storing said information control blocks, overflow sectors and logical links in temporary storage, wherein said information control blocks, overflow sectors and logical links are identified by said information control block addresses, and wherein said information control blocks comprise attributes and a list of extents for said directories and subdirectories;

(e) reading said directories and subdirectories, starting at said root directory, in a preset order, to minimize the number of media swaps necessary to obtain information control block addresses and names of said directories and said subdirectories; and (f) matching said information control block addresses from said directories and subdirectories with said information control block addresses stored in said temporary storage to retrieve and correlate said names of said directories and subdirectories with said attributes and said list of extents for each directory and subdirectory.

10. A method for sequentially writing non-sequentially formatted metadata and data for a set of files on a multiple volume media set, wherein said method minimizes a number of media swaps necessary to read and write said metadata and data from and to said multiple volume media set, comprising the steps of:

(a) writing out the data sequentially for the set of files on the multiple volume media set;

(b) reserving a list of extents describing a location and a plurality of attributes of each of the files whose data was written in step (a) in temporary storage;

(c) determining an amount of space on the multiple volume media set required to store an information control block table containing information control blocks for all data files and directories as well as any overflow sectors and logical links in the set of files;

(d) reserving space, on the multiple volume media set, for said information control block table to be recorded in a first portion having a size sufficient to store said information control block table;

(e) building a directory having an entry for each of its subdirectories and files, wherein each entry has an information control block address sequentially assigned to each of said subdirectories and said files;

(f) writing said directory to a second portion of the multiple volume media set;

(g) repeating steps (e)–(f) for every other directory file in said set of files, wherein said repeating step starts at a starting point and follows a preset order;

(h) building an information control block for each of said data files and directories in the set of files, directories and subdirectories; and (i) writing each of said information control blocks built at step (h) into said information control block table at said information control block address assigned in step (e), wherein the number of media swaps necessary to read and write said metadata and data from and to said multiple volume media set is minimized.

11. The method of claim 10, wherein, said information control block comprises attributes and extent information retrieved from said temporary storage.

12. The method of claim 10, wherein said overflow sector is placed immediately subsequent to said information control block referencing it.

13. The method of claim 10, wherein said logical links are placed immediately subsequent to said information control block referencing it.

14. The method of claim 10, wherein said information control blocks are written in step (i) starting from said starting point and following said preset order, whereby any temporary storage required in steps (f)–(i) is reduced.

15. The method of claim 10, wherein said preset order is recursive descent order and wherein said starting point is root.

16. The method of claim 10, further comprising the step of:

(j) writing a list of extents describing it location of said first portion of said information control block table to a volume header in the multiple volume media set.

17. The method of claim 10, further comprising the step of:

(j) writing a list of extents describing a location of said first portion of said information control block table in an implementation specific attribute of said information control block for a root directory.

* * * * *

UNITED STATES PATENT AND TRADEMARK OFFICE
CERTIFICATE OF CORRECTION

PATENT NO. : 5,579,516
DATED : November 26, 1996
INVENTOR(S) : David J. Van Maren; Jeffrey Dicorpo It is certified that error appears in the above-identified patent and that said Letters Patent is hereby corrected as shown below:

Column 11, Claim 9,
Line 1.20: Delete "2" and insert therefor -- 1 --;

Signed and Sealed this

Thirty-first Day of July, 2001

Attest:

*Nicholas P. Godici*

NICHOLAS P. GODICI
*Attesting Officer*   *Acting Director of the United States Patent and Trademark Office*